US005758147A

United States Patent [19]
Chen et al.

[11] Patent Number: 5,758,147
[45] Date of Patent: May 26, 1998

[54] EFFICIENT INFORMATION COLLECTION METHOD FOR PARALLEL DATA MINING

[75] Inventors: Ming-Syan Chen, Yorktown Heights; Philip Shi-lung Yu, Chappaqua, both of N.Y.

[73] Assignee: International Business Machines Corporation, Armonk, N.Y.

[21] Appl. No.: 496,237

[22] Filed: Jun. 28, 1995

[51] Int. Cl.$^6$ ............................................. G06F 17/30
[52] U.S. Cl. .................... 395/606; 395/603; 395/605; 364/401 R; 364/402; 364/403; 364/406
[58] Field of Search ................. 364/401 R, 402, 364/403, 406; 395/600, 606, 605, 603

[56] References Cited

U.S. PATENT DOCUMENTS

| | | | |
|---|---|---|---|
| 4,799,156 | 1/1989 | Shavit et al. | 364/401 |
| 5,197,002 | 3/1993 | Spencer | 364/406 |
| 5,223,827 | 6/1993 | Bell et al. | 340/825.06 |
| 5,255,181 | 10/1993 | Chapman et al. | 364/401 |
| 5,324,922 | 6/1994 | Roberts | 235/375 |
| 5,461,699 | 10/1995 | Arbabi et al. | 395/23 |
| 5,467,268 | 11/1995 | Sisley et al. | 364/403 |
| 5,495,656 | 10/1995 | Fields et al. | 364/401 |

OTHER PUBLICATIONS

Agrawal et al., "Mining Sequential Patterns" Porc of the Elements Int'l cont. on Data Engineering, pp. 3–14 Mar. 1995.

Agrawal et al. "Database Mining: A Performance Perspective"IBM Almaden Research Center, San Jose, California pp. 1–22 Jul. 1992, Jan. 1990.

Houtsma et al. "Set–Oriented Mining for Association Rules in Relational DatabaseS" IEEE, pp. 25–33 Jun. 1995.

Rakesh Agrawal et al., "Database Mining: A Performance Perspective", IEEE Transactions on Knowledge and Data Engineering V. 5, No. 6, Dec. 1993, pp. 914—925.

Rakesh Agrawal et al., "Mining Sequential Patterns", Proc. of the Eleventh International Conference on Data Engineering, Mar. 1995, V. 6, No. 10, pp. 3—14.

Primary Examiner—Thomas G. Black
Assistant Examiner—Jean M. Corrielus
Attorney, Agent, or Firm—Kevin M. Jordan

[57] ABSTRACT

An efficient method and system of communicating and accumulating global information for parallel data mining. Since each database is partitioned, a single node in a parallel environment will be unable to make decisions based on global information. A novel technique of progressive thresholding is devised to accumulates global information as a function of a transaction support threshold while minimizing transmission overhead. The transaction support threshold is varied as a function of the number of nodes contributing to the global information progresses.

15 Claims, 6 Drawing Sheets

EFFICIENT INFORMATION COLLECTION METHOD FOR PARALLEL DATA MINING

BACKGROUND OF THE INVENTION

1. Field of the Invention

The present invention relates to the methods of communicating and accumulating global information for data mining in a parallel partitioned database environment.

2. Related Art

The importance of database mining is growing at a rapid pace. Progress in bar-code technology has made it possible for retail organizations to collect and store massive amounts of sales data. Catalog companies can also collect sales data from the orders they receive. A record in such data typically consists of the transaction date, the items bought in that transaction, and possibly the customer-id if such a transaction is made via the use of a credit card or customer card.

Analysis of past transaction data can provide very valuable information on customer buying behavior, and thus improve the quality of business decisions such as: what to put on sale; which merchandise should be placed on shelves together; and how to customize marketing programs; to name a few. It is, however, essential to collect a sufficient amount of sales data before any meaningful conclusions can be drawn therefrom. It is therefore important to devise efficient methods of communicating and mining the 'gold' in these often enormous volumes of partitioned data.

The most important data mining problem is mining association rules. By mining association rules it is meant that given a database of sales transactions, the process of identifying all associations among items such that the presence of some items in a transaction will imply the presence of other items in the same transaction. It is known that mining association rules can be decomposed into two subproblems. First, all sets of items (itemsets) that are contained in a sufficient number of transactions above a minimum (support) threshold are identified. These itemsets are referred to as large itemsets. Once all large itemsets are obtained, the desired association rules can be generated therefrom in a straightforward manner.

Database mining in general requires progressive knowledge collection and analysis based on a very large transaction database. When the transaction database is partitioned across a large number of nodes in a parallel database environment, the volume of inter-node data transmissions required for reaching global decisions can be prohibitive, thus significantly compromising the benefits normally accruing from parallelization. It is therefore important to devise efficient methods for mining association rules in a parallel database environment.

SUMMARY OF THE INVENTION

It is an objective of this invention to provide an efficient method and system of information communication and collection for parallel data mining.

Consider a transaction as a collection of items, and a large itemset as a set of items such that the number of transactions containing it exceeds a pre-specified threshold. In a parallel database environment, all transactions are partitioned across all processing nodes. This invention provides a method and system for efficiently identifying a global set for large itemsets while minimizing the volume of inter-node data exchanges required. Specifically, each processing node first collects (count) information on each itemset from the partitioned portion of the parallel database visible to the node. In general each node is unable to identify large itemsets by itself. Next, the information collected by each node is shared with all other nodes as a function of a transaction support threshold by communication techniques well known in the art. Then, the invention uses progressive thresholding to address the uncertainty due to the partial knowledge collected at each node. This is accomplished by judiciously varying the threshold to select only a small fraction of the itemsets for the exchange of count information among nodes, thus reducing communication costs. The fraction of the itemsets selected changes as the process of collecting global information proceeds. The global set of large itemsets can then be determined based on the aggregate count of itemsets.

These, and other objects, features and advantages of this invention will become apparent from the following detailed description of the invention taken in conjunction with the accompanying drawings.

DETAILED DESCRIPTION OF A PREFERRED EMBODIMENT

This invention provides an efficient method and system of communicating and accumulating information for parallel data mining.

Figure 1:
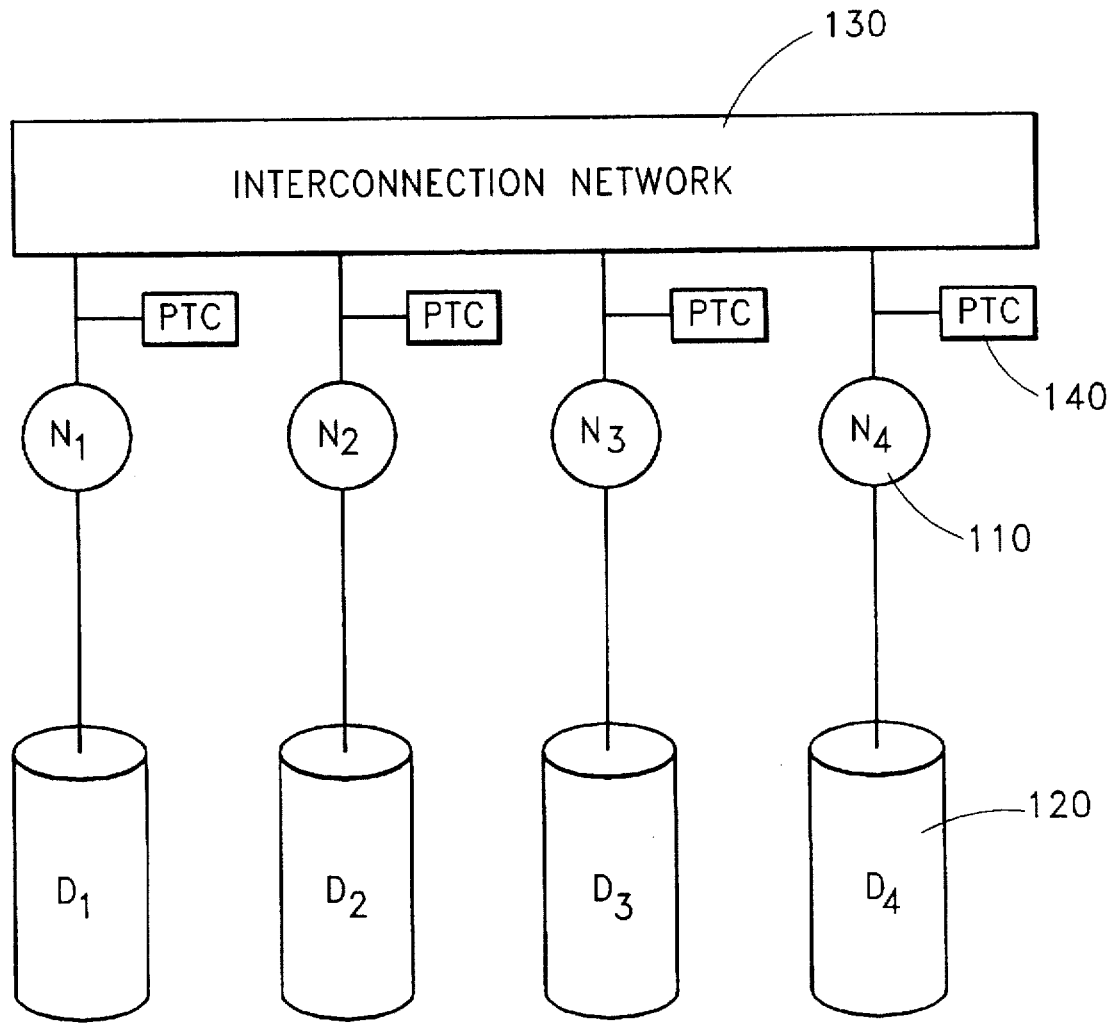
FIG. 1 is an illustration of a system in accordance with the present invention.

FIG. 1 illustrates an embodiment of a parallel database system having four processing nodes in accordance with the present invention. Each processing node 110 has its own local disk 120 in which a partition of the transaction database is stored. Processing nodes communicate with other nodes via an interconnection network 130. As will be clearly explained later, each node 110 utilizes a progressive threshold controller (PTC) 140 to keep track of the source nodes of the information it receives and to minimize inter-nodal communication requirements.

Figure 2:
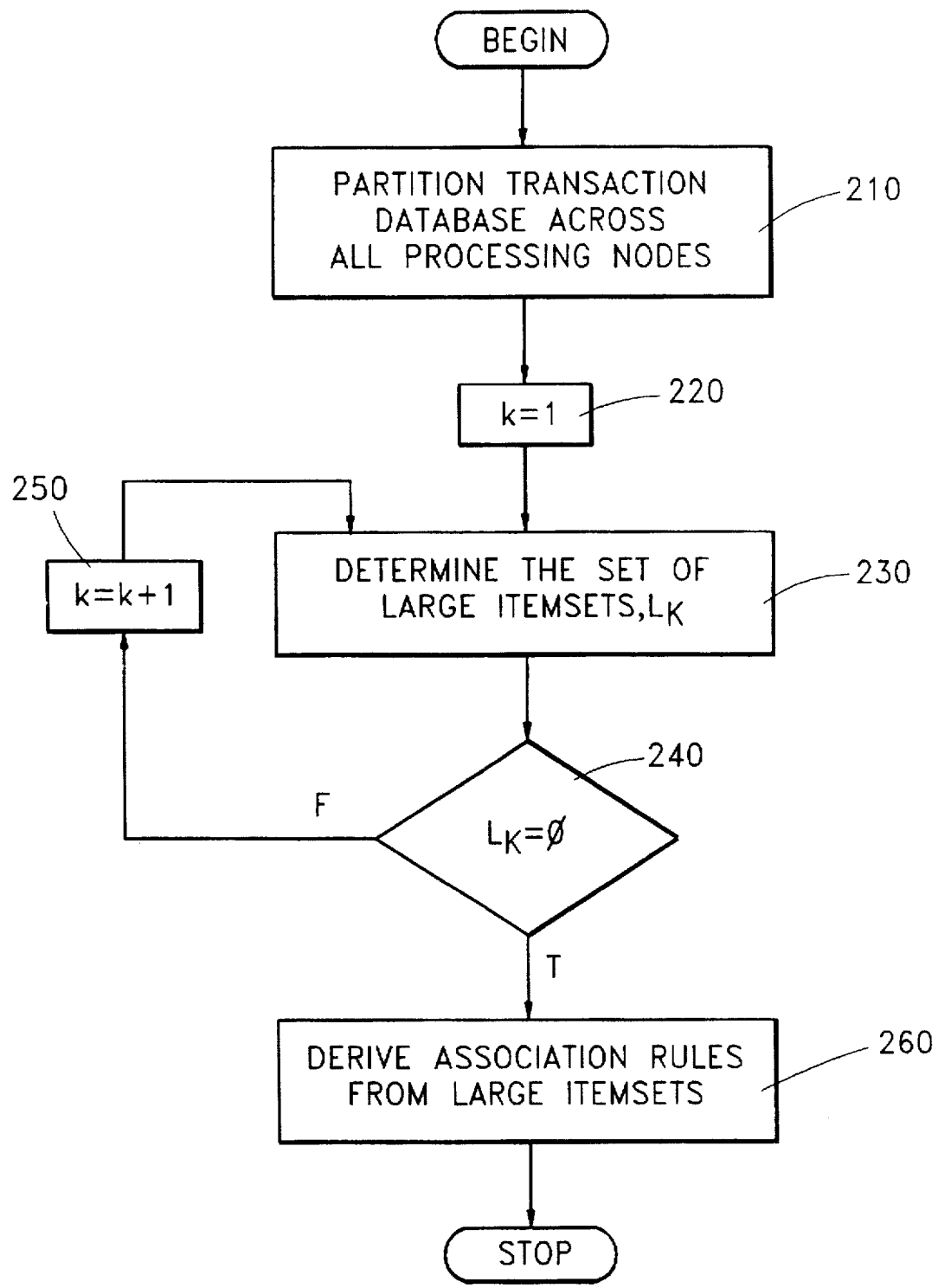
FIG. 2 shows a flowchart of the procedure for parallel data mining with progressive thresholds.

FIG. 2 shows a flowchart of a method of parallel data mining employing progressive thresholds in accordance with the present invention. In step 210, the transaction database is partitioned across all processing nodes. (The database partitions are stored in disks 120 in FIG. 1.) In step 220, an iteration number parameter, k, is initialized to a value of one. In steps 230, 240 and 250, large itemsets are determined one by one, in increasing order of k, until an empty large itemset is encountered in step 240. After all large itemsets are obtained, association rules can be derived accordingly in step 260. Methods to derive association rules from the identified large itemsets (i.e., step 260) are well known in the art, are not part of the present invention, and will not be discussed further herein. See e.g., R. Agrawal and S. Srikant, "Fast Algorithms for Mining Association Rules in Large Databases", Proceedings of the 20th International Conference on Very Large Data Bases, September 1994, pp. 478-499 hereby incorporated by reference.

Figure 3:
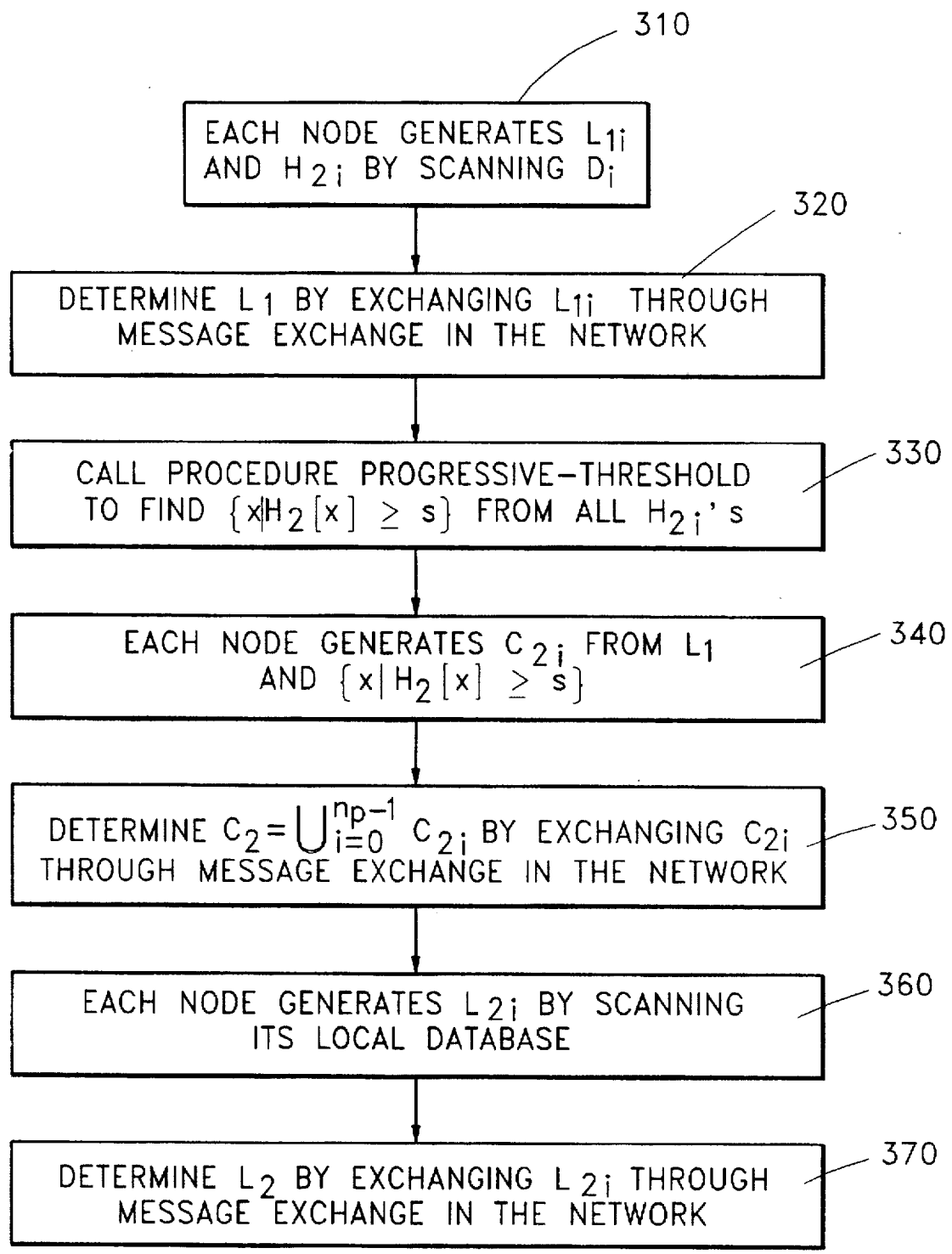
FIG. 3 shows a flowchart of the procedure for determining sets of large itemsets, $L_1$, and $L_2$.
Figure 4:
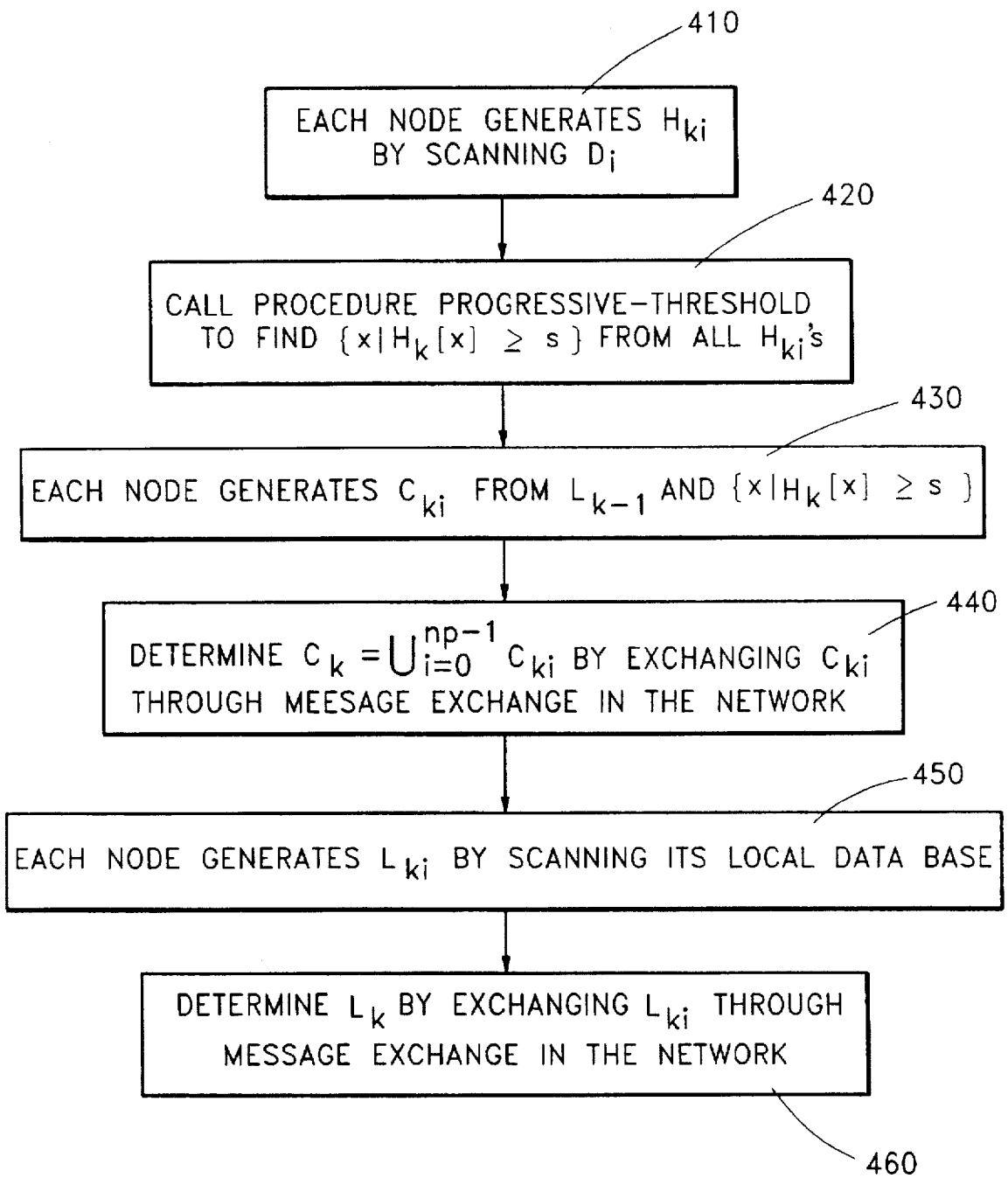
FIG. 4 shows a flowchart of the procedure for determining sets of large itemsets, $L_k$ where $k \geq 3$.

Step 230 in FIG. 2, i.e., determining the set of large itemsets will now be described in further detail. Let $n_p$ be the number of nodes 110 and $D_i$ denote a partitioned database 120 located at node i. A process for determining $L_1$ and $L_2$, i.e., the sets of large 1-itemsets and large 2-itemsets is shown in FIG. 3. A process for obtaining additional large itemsets (i.e., large 3-itemsets, large 4-itemsets, etc.) is shown in FIG. 4.

Figure 6:
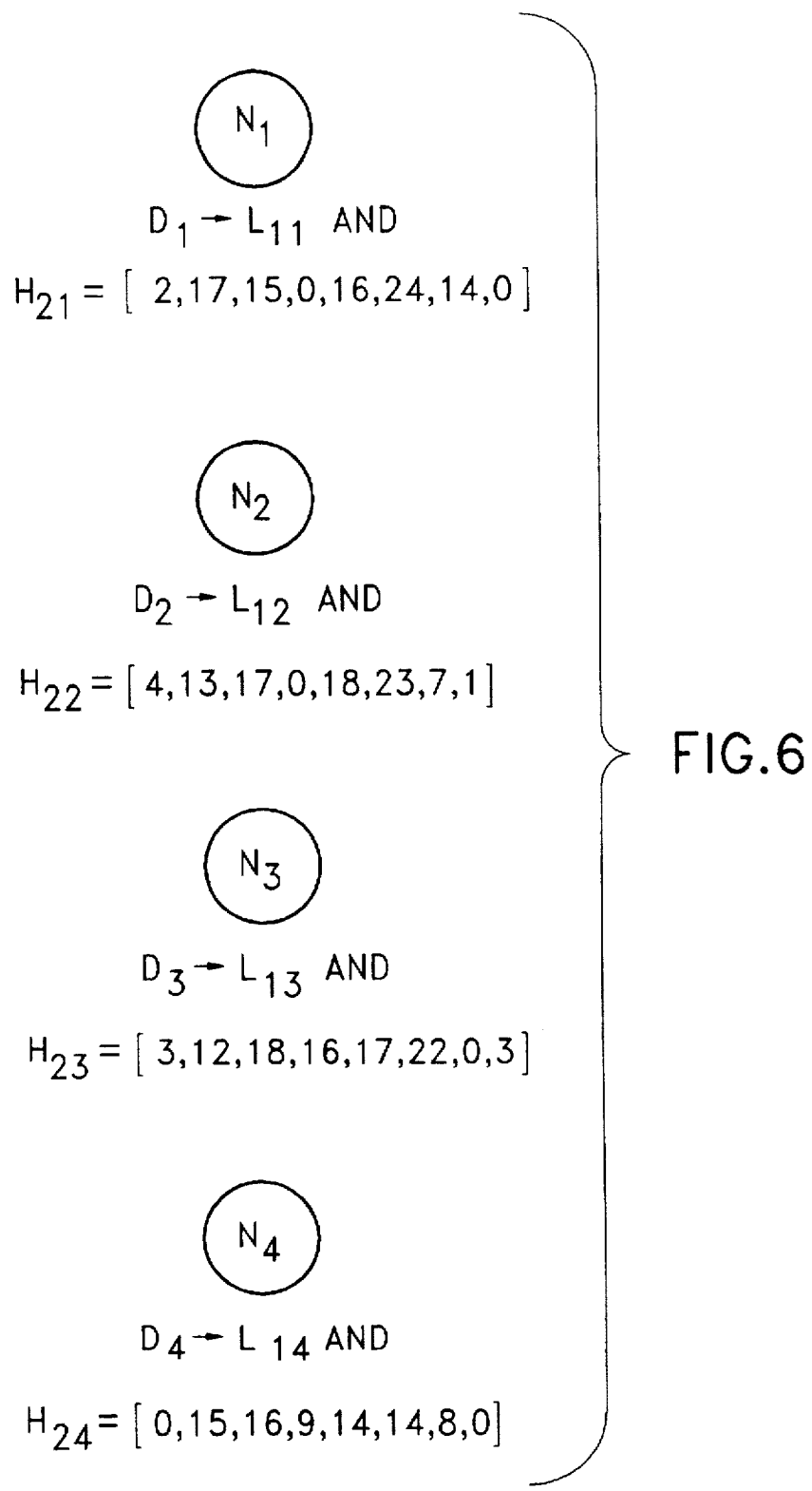
FIG. 6 gives an illustrative example for the partial information collected by each node.

By way of overview, each node i starts by counting the occurrences of each item in $D_i$. Let $L_{1i}$ represent the set of potential large 1-itemsets, each of which has an associated count for its occurrences in $D_i$. As illustrated in FIG. 6, each node may also build a hash table to facilitate the counting of the occurrences for each large 2-itemset. Hashing functions are well known in the art; see for example E. G. Coffman Jr. and J. Eve, "File Structures Using Hashing Functions", Communication of the ACM, 13(7):427–432, 436, July 1970, hereby incorporated by reference. Let $H_{2i}$ to represent a hash table and its associated counts for hash buckets on node i. Note that in contrast to the sequential case, the counts at each node here only contain information on a single database partition. To obtain the global counts, it is necessary to sum $L_{1i}$ and $H_{2i}$ over all nodes to obtain $L_1$ and $H_2$ where $H_2$ represents the hash table and its associated count, for hash buckets across all nodes. However, the size of $H_{2i}$ is usually large and the cost of direct exchange could be very high. To deal with this, a novel approach employing progressive thresholds is utilized to judiciously select only a small number of hash buckets, which have the potential to meet the support threshold, for information exchange. Specifically, instead of constructing $H_2$, we only need to determine its subset which may have hash counts larger than or equal to the minimal transaction support threshold s. The set of hash buckets that have hash counts larger than or equal to s is denoted by $\{x|H_2[x] \geq s\}$. By exchanging $H_{2i}$ among all nodes, we then get $H_2$. With $H_2$ and $L_{2i}$, each node can hence determine, based on its local database, its candidate set of large 2-itemsets, denoted by $C_{2i}$. Then, the global candidate set of large 2-itemsets, $C_2$, is obtained by exchanging $C_{2i}$ among all nodes. Note that a large 2-itemset which does not have a sufficient count by itself may be included into $C_2$ simply because it was hashed into a hash bucket whose aggregate count from many large 2-itemsets meets the support requirement. Such a scenario is called hash collision. As a result of hash collisions, not every 2-itemset in $C_2$ has the minimum support by itself. This is the very reason that $C_2$ is called the 'candidate' set of large 2-itemsets. Using $C_2$, each node can next scan its local database partition, in parallel, to derive $L_{2i}$, where $L_{2i}$ is the set of potential large 2-itemset based on $D_i$, thus associating each large 2-itemset in $C_2$ with its corresponding support count in the local database. By exchanging $L_{2i}$ among all nodes, the set of large 2-itemsets, $L_2$, can be determined. Additional passes for determining the large itemsets can be performed similarly. After all large itemsets are obtained, the association rules can be determined accordingly.

FIG. 3 illustrates a preferred embodiment of a method in accordance with the present invention for determining the first two large itemsets, i.e., $L_1$ and $L_2$. In step 310, each node generates $L_{1i}$ and $H_{2i}$ by scanning $D_i$. In step 320, each node determines $L_1$ by exchanging $L_{1i}$ through message exchange via the interconnection network 130. In step 330, procedure Progressive-Threshold is called to find $\{x|H_2[x] \geq s\}$ from all $H_{2i}$s. In step 340, each node generates $C_{2i}$ from $L_1$ and $\{x|H_2[x] \geq s\}$ where $C_{2i}$ is the candidate set of large 2-itemsets identified on node i. In step 350, $C_2$ is determined by $$C_2 = \bigcup_{i=0}^{n_p-1} C_{2i}$$

by exchanging $C_{2i}$ through message exchanges via the interconnection network 130. In step 360, each node generates $L_{2i}$ by scanning its local database. Finally, in step 370 each node determines $L_2$ by exchanging $L_{2i}$ through message exchanges via the interconnection network 130.

Referring now to FIG. 4, an example of a method for determining additional large itemsets in accordance with the present invention is described. In step 410, each node generates $H_{ki}$ by scanning $D_i$. In step 420, Procedure Progressive-Threshold is called to find $\{x|H_k[x] \geq s\}$ from all $H_{ki}$'s. In step 430, each node generates $C_{ki}$ from $L_{k-1}$ and $\{x|H_k[x] \geq s\}$. In step 440, $$C_k = \bigcup_{i=0}^{n_p-1} C_{ki}$$

is determined by exchanging $C_{ki}$ through message exchange via the interconnection network 130. In step 450, each node generates $L_{ki}$ by scanning its local database. Finally, in Step 460, each node determines $L_k$ by exchanging $L_{ki}$ through message exchange via the interconnection network 130.

Next, procedure Progressive-Threshold, which may be used to identify bucket addresses with the potential to reach the minimum support threshold, $\{x|H_2[x] \geq s\}$, is described. One alternative would be to exchange $H_{2i}$ among all nodes. However, this method incurs substantial communication costs since the size of $H_{2i}$ is usually very large. To minimize communication costs, the invention employs progressive thresholding to judiciously exchange only a small set of elements which could possibly reach the minimum support threshold.

It is noted that $x \in \{y | H_2[y] \geq s\}$ means $$\sum_{i=0}^{n_p-1} x.count_i \geq s,$$

where $x.count_i$ is the count information of the bucket address x at node i. Obviously, as a necessary condition for a hash address to have a global count reaching the minimal support threshold requirement s, there must exist at least one node j with a count of that bucket address, $x.count_j$, greater than or equal to $$\lfloor \frac{s}{n_p} \rfloor,$$

where $n_p$ is the number of partitioned nodes. In light of this, if each node exchanges only bucket addresses with a count greater than or equal to $$\lfloor \frac{s}{n_p} \rfloor,$$

no hash bucket with the minimal support threshold will be omitted. After the exchange, each node can obtain a cumulative count by adding together the count values at each bucket address. We maintain for each hash bucket x, its accumulated count, x.count, and the number of nodes, denoted by $x.n_b$, that sent information on the bucket. The hash buckets of the resulting hash table can be divided into two classes:

1. $x.count \geq s$, where x is a bucket address reaching the minimum support threshold; and 2. x.count<s.

For the first case, the count in this hash bucket has reached the minimum support threshold and thus will be involved in later processing. Note, however, that the accumulated count for hash bucket x does not necessarily include the counts from all $n_p$ nodes because only those nodes with their counts for hash bucket x reaching the exchange threshold $$\lfloor \frac{s}{n_p} \rfloor$$

have communicated their count information. In view of this, for the second case, it needs to be determined whether or not the bucket could exceed the support requirement if all the remaining nodes which did not send in their bucket counts are polled.

In general, whether or not a node will include the count of a certain hash bucket with the next transmission depends the current count of that hash bucket. Furthermore, nodes at different stages of message passing will receive different amounts of aggregate information, and thus should use different support thresholds for the current count. For a node receiving the information from j nodes, the corresponding threshold is denoted by Thr(j) where $$Thr(j) = \left( \frac{s}{n_p} \right)(j).$$

The polling criterion will now be described. There are $(n_p-x.n_b)$ nodes which did not send information on the bucket address x. Suppose $$\frac{Thr(i)}{i} = \frac{Thr(j)}{j}$$

for all i, j. Thus, the sum of the counts from nodes which did not send information on bucket address x has an upper bound of $Thr(n_p-x.n_b)$. The maximum value of the count after polling this set of nodes is hence $x.count+Thr(n_p-x.n_b)$. If this maximum count value exceeds the minimum support threshold, the $(n_p-x.n_b)$ nodes should be polled. Each of these $(n_p-x.n_b)$ nodes, upon receiving the request, exchanges its count on the bucket address x with all other nodes.

Figure 5:
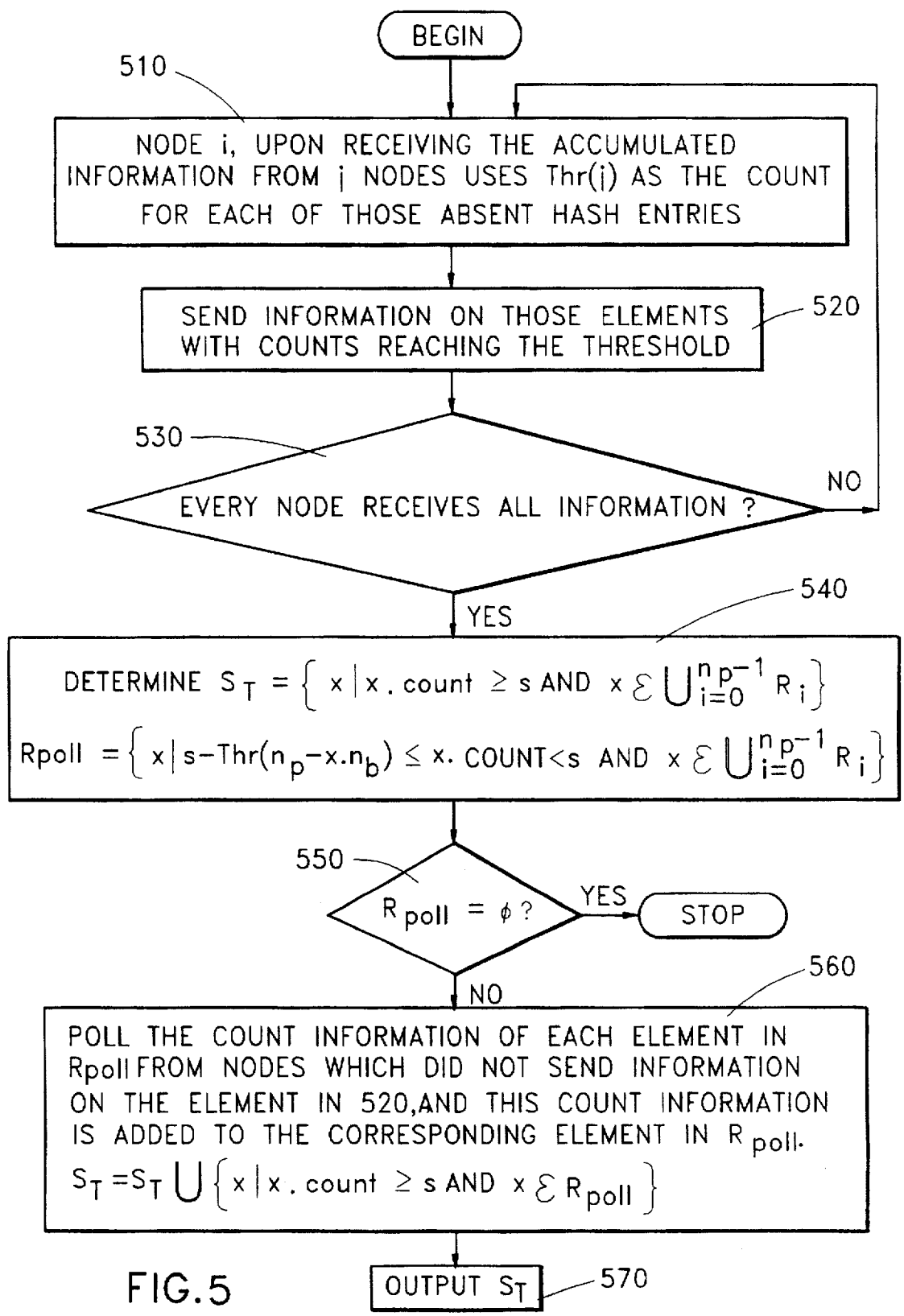
FIG. 5 shows a flowchart of the Progressive Threshold procedure.

FIG. 5 depicts an example of a procedure, Progressive-Threshold, in accordance with the present invention for identifying elements capable of reaching the required minimum support threshold. In step 510, node i, upon receiving the accumulated information from j nodes, uses Thr(j) as the count for each of the aforementioned missing hash bucket addresses. Here, the "information" includes (1) the identities of hash buckets which have counts meeting the support threshold, and (2) the corresponding counts of those hash buckets. In step 520, node i sends to all other nodes the set of hash buckets that have counts reaching the support threshold. Such a set of hash buckets from node i is denoted by $R_i$. Thus, $R_i=\{x|x.count \geq Thr(q)\}$, where x.count is the aggregate count for hash entry x and q is the total number of nodes contributing to x (including node i). Then, steps 510 and 520 are iteratively performed through message exchange via the interconnection network 130 until every node has received the aforementioned information from all other nodes. Next, in step 540, the set of hash buckets that have aggregate counts reaching the support threshold, denoted by $S_T$, is determined, i.e., $$S_T = \{x|x.count \geq s \text{ and } x \in \bigcup_{i=0}^{n_p-1} R_i\}.$$

Note that during some message exchanges, nodes omit information on hash buckets which have not reached the support threshold in order to reduce transmission overhead. As a result, there are some hash buckets, which are not in $S_T$, whose aggregate counts could reach the support threshold. Whether or not the counts of those hash buckets will reach the threshold is yet to be determined. The set of such hash buckets is denoted by $R_{poll}$. Formally, we have, $$R_{poll} = \{x|s - Thr(np - x.n_b) \leq x.count < s \text{ and } x \in (\bigcup_{i=0}^{n_p-1} R_i)\},$$

where s is the minimum transaction support threshold and $x.n_b$ is the number of nodes which transmitted hash bucket x. In step 550, if $R_{poll}=\phi$, i.e., the empty set then stop. Otherwise: in step 560, each node polls the count information of each hash bucket in $R_{poll}$ from nodes which did not send information on the hash bucket in step 520, and this count information is added to the corresponding hash bucket in $R_{poll}$. $S_T$ is then updated accordingly, i.e., $S_T \cup \{x|x.count \geq s \text{ and } x \in R_{poll}\}$. In step 570, the final set of hash buckets which have counts meeting the support threshold, i.e., $S_T$, is output.

The progressive thresholding method in FIG. 5 for determining bucket addresses capable of reaching the minimum support threshold can be best understood by a numerical example given in FIG. 6, where the number of nodes $n_p=4$. Suppose that the minimum support threshold s =60 and for simplicity that every node sends its messages to all other nodes in parallel. We have $$Thr(j) = \left( \lfloor \frac{s}{n_p} \rfloor \right).$$
$$j = 15j$$

First, in step 510, before receiving any messages from others, node 1 has j=1 (i.e., it has local information only), and thus uses Thr(1)=15 as the threshold, and transmits count information on bucket address 2, 3, 5 and 6. Node 1 also receives information on bucket addresses with counts greater than or equal to $$\lfloor \frac{s}{n_p} \rfloor = 15$$

from all other nodes. After step 530 in FIG. 5, all nodes have $$\bigcup_{i=2}^{n_p-1} R_i$$

={(2,32,2), (3,66,4), (4,16,1), (5,51,3), (6,69,3)}, where the triplet in each parenthesis represents (x, x.count $x.n_b$), i.e., the bucket address, the accumulated counts from the exchange, and the number of nodes sending information on the bucket, respectively. In step 540 it is determined that $S_T$ ={x|$H_2$[x]$\geq$s}={3,6} and $R_{poll}$ ={2,5}. The value of ST indicates that the counts in buckets 3 and 6 have met the minimum support threshold of 60. $R_{poll}$ indicates that the potential of the counts in buckets 2 and 5 to meet the minimum support threshold of 60 must be determined. Then, in step 550 since $R_{poll}$= {2,5} $\approx \phi$, the count information of each element in $R_{poll}$ is polled in step 560. Consequently, information on buckets 2 and 5 is updated to become {(2,57,4), (5,65,4)}. Finally, in step 570 $S_T$={2,4,5} is output meaning that the counts in buckets 2, 4 and 5 have met the minimum support threshold of 60.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

Having thus described our invention, what we claim as new and desire to secure by Letters Patent is:

1. A method of communicating and accumulating global information contained in a parallel transaction database which is partitioned across a plurality of nodes, wherein a transaction has at least one event associated therewith, comprising the steps of:

determining a local count of all events associated with each node;

communicating and accumulating the local count of events across all nodes as a function of a transaction support threshold, responsive to said determining;

varying the transaction support threshold as a function of how many nodes have contributed to a cumulative count of events in a given node, responsive to said communicating and accumulating; and determining a set of global events which meet the transaction support threshold, responsive to said communicating and said varying.

2. The method of claim 1, further comprising the step of:

generating association rules amongst events meeting the transaction support threshold, responsive to said determining.

3. The method of claim 1 wherein said determining the set of global events further comprises polling nodes which did not contribute to the cumulative count of events when a maximum count value exceeds the transaction support threshold.

4. The method of claim 1 wherein said accumulating the local count of events across all nodes is accomplished using a hash table and hashing function.

5. A method of communicating and accumulating global information contained in a parallel transaction database which is partitioned across a plurality of nodes, wherein a transaction has at least one event associated therewith, comprising the steps of:

determining a local count of all events associated with each node;

communicating and accumulating the local count of events across all nodes as a function of a transaction support threshold, responsive to said determining;

wherein said accumulating the local count of events across all nodes is accomplished using a hash table and hashing function;

varying the transaction support threshold as a function of how many nodes have contributed to a cumulative count of events in a given node, responsive to said communicating and accumulating;

determining a set of global events which meet the transaction support threshold, responsive to said communicating and said varying;

wherein said determining the set of global events further comprises polling nodes which did not contribute to the cumulative count of events when a maximum count value exceeds the transaction support threshold; and generating association rules amongst events meeting the transaction support threshold, responsive to said determining.

6. A program storage device readable by a machine, tangibly embodying a program of instructions executable by the machine to perform method steps for communicating and accumulating global information contained in a parallel transaction database which is partitioned across a plurality of nodes, wherein a transaction has at least one event associated therewith, said method steps comprising:

determining a local count of all events associated with each node;

communicating and accumulating the local count of events across all nodes as a function of a transaction support threshold, responsive to said determining;

varying the transaction support threshold as a function of how many nodes have contributed to a cumulative count of events in a given node, responsive to said communicating and accumulating; and determining a set of global events which meet the transaction support threshold, responsive to said communicating and said varying.

7. The program storage device of claim 6, further comprising the step of:

generating association rules amongst events meeting the transaction support threshold, responsive to said determining.

8. The program storage device of claim 6 wherein said determining the set of global events further comprises polling nodes which did not previously contribute to the cumulative count of events, said polling being a function of a maximum count value exceeding the transaction support threshold.

9. The program storage device of claim 6 further comprising a hash table wherein said accumulating the local count of events across all nodes is accomplished using a hashing function associated with said hash table.

10. A program storage device readable by a machine, tangibly embodying a program of instructions executable by the machine to perform method steps for communicating and accumulating global information contained in a parallel transaction database which is partitioned across a plurality of nodes, wherein a transaction has at least one event associated therewith, said method steps comprising:

determining a local count of all events associated with each node;

communicating and accumulating the local count of events across all nodes as a function of a transaction support threshold, responsive to said determining;

wherein said accumulating the local count of events across all nodes is accomplished using a hash table and hashing function;

varying the transaction support threshold as a function of how many nodes have contributed to a cumulative count of events in a given node, responsive to said communicating and accumulating;

determining a set of global events which meet the transaction support threshold, responsive to said communicating and said varying;

wherein said determining the set of global events further comprises polling nodes which did not previously contribute to the cumulative count of events, said polling being a function of a maximum count value exceeding the transaction support threshold; and generating association rules amongst events meeting the transaction support threshold, responsive to said determining.

11. A system for communicating and accumulating global information contained in a parallel transaction database which is partitioned across a plurality of nodes which are communicatively coupled by an interconnection network, wherein a transaction has at least one event associated therewith, said system comprising:
- a memory coupled to each node for storing and accessing each parallel transaction database;
- a local event counter for determining a local count of all events associated with each node;
- an event accumulator for communicating and accumulating the local count of events across all nodes as a function of a transaction support threshold, responsive to said local event counter;
- a progressive threshold controller associated with each node wherein said progressive threshold controller is adapted for varying the transaction support threshold as a function of how many nodes have contributed to a cumulative count of events in a given node, responsive to said event accumulator; and
- a global event counter for determining a set of global events which meet the transaction support threshold, responsive to said event accumulator and said progressive threshold controller.

12. The system of claim 11, further comprising:
means for generating association rules amongst events meeting the transaction support threshold, responsive to said global event counter.

13. The system of claim 11 wherein said global event counter further comprises means for polling nodes which did not previously contribute to the cumulative count of events, said polling being a function of maximum count value exceeding the transaction support threshold.

14. The system of claim 11 wherein said memory comprises a hash table stored therein and said event accumulator includes a hashing function for accessing said hash table.

15. A system for communicating and accumulating global information contained in a parallel transaction database which is partitioned across a plurality of nodes which are communicatively coupled by an interconnection network, wherein a transaction has at least one event associated therewith, said system comprising:
- a memory coupled to each node for storing and accessing both the parallel transaction database and a hash table;
- a local event counter for determining a local count of all events associated with each node;
- an event accumulator including a hashing function associated with the hash table for communicating and accumulating the local count of events across all nodes as a function of a transaction support threshold, responsive to said local event counter;
- a progressive threshold controller associated with each node wherein said progressive threshold controller is adapted for varying the transaction support threshold as a function of how many nodes have contributed to a cumulative count of events in a given node, responsive to said event accumulator; and
- a global event counter for determining a set of global events which meet the transaction support threshold, responsive to said event accumulator and said progressive threshold controller wherein said global event counter further comprises means for polling nodes which did not previously contribute to the cumulative count of events, said polling being a function of a maximum count value exceeding the transaction support threshold; and
- means for generating association rules amongst events meeting the transaction support threshold, responsive to said global event counter.

\* \* \* \* \*